Sept. 13, 1932.   S. H. BROOKS   1,877,487
REGULATOR VALVE
Filed Dec. 23, 1926

Stephen H. Brooks, Inventor

Attorney

Patented Sept. 13, 1932

1,877,487

UNITED STATES PATENT OFFICE

STEPHEN H. BROOKS, OF LOS ANGELES, CALIFORNIA, ASSIGNOR TO BROOKS ENGINEERING CORPORATION, OF LOS ANGELES, CALIFORNIA, A CORPORATION OF CALIFORNIA

REGULATOR VALVE

Application filed December 23, 1926. Serial No. 156,614.

My invention relates to improvements in regulator valves, and it more especially consists of the features pointed out in the annexed claims.

The purpose of my invention is to provide an automatic valve responsive to very small changes of either positive or negative pressures; that is free from stuffing boxes and other frictional adjuncts of this type of valve as heretofore constructed; that does not have any exposed movable parts; that may be used singly or in pairs as found necessary to meet the varying conditions of actual practice; that automatically provides an outlet for accumulating vapors in storage tanks; and that contrariwise admits a non-inflammable gas to a storage tank to overcome any vacuum that may be formed in the tank. A copending application also relating to regulator valves by applicant was filed January 30, 1928, under Serial #250,691.

With these and other ends in view, I illustrate in the accompanying drawing such instances of adaptation as will disclose the broad underlying features of my invention without limiting myself to the specific details shown thereon and described herein.

In practically carrying out my invention, I may use such alternatives of construction as the exigencies of actual use may demand without departing from the broad spirit of my invention.

Figure 1:
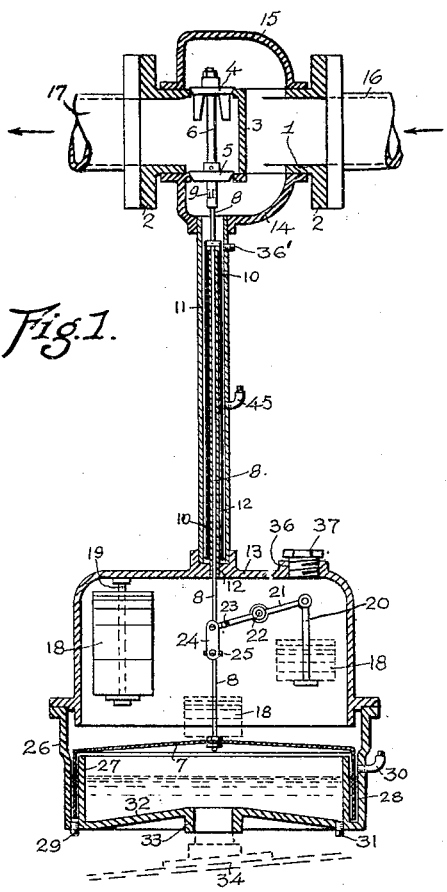
Figure 1 is an elevation, partly in section, of a single regulator attached to a tank roof.
Figure 4:
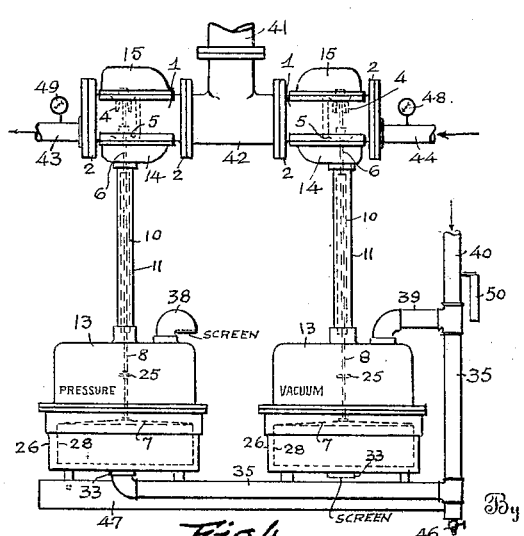
Fig. 4 is a diagrammatic elevation of a pair of regulator valves connected to form a unitary control.

The valves used in my pressure regulating device are of the balanced type connected to the same operating stem, which stem passes down through a mercury seal to a flanged diaphragm of very large area. The diaphragm operates in an oil seal in a suitable casing and the valves are enclosed in a separate casing, the two casings being connected by a tube in which the mercury seal is formed. When a pair of control devices are placed side by side, the valve casings, as shown in Fig. 4, are joined by a T that communicates with the top of a storage tank. The regulators are duplicates of each other and instead of the diaphragm casings when used singly being placed on the roof of a tank, as shown in Fig. 1, so as to have the pressure conditions within the tank in direct communication with the diaphragm, the controls otherwise placed receive pressure from the tank, in the one case beneath the diaphragm to form a pressure control and in the other case the negative pressure acts on the upper side of the diaphragm, thus forming a vacuum control. The pressure and vacuum controls are attached to a common support so as to facilitate their being handled and installed.

Figure 2:
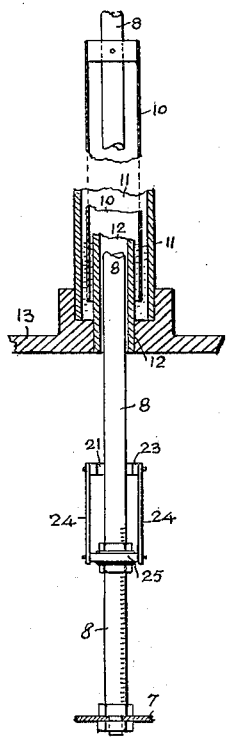
Fig. 2 is an enlarged elevation in section of a mercury seal for the valve operating stem.

The valve casing 1 has an opening from each end where the attaching flanges 2 are located. A cross partition 3 is formed adjacent the upper valve 4 and the lower valve 5 which are connected together by a stem 6 so as to be in equilibrium or in balanced relation, thereby placing a minimum amount of work on the operating diaphragm 7. The valve stem 6 is attached to a connecting stem 8 by a universal joint 9. The stem 8 is attached to the diaphragm 7. It has secured thereon a thin walled tube 10, as shown in Fig. 2, which tube forms a mercury seal between an outer tube 11 and an inner tube 12. The outer tube at its lower end is secured to the casing 13 and at its upper end is secured to the lower cap 14 of the valve casing 1. The inner tube 12 is also attached to the casing 13 but it terminates below the point where the tube 10 is attached to the stem 8. An upper cap 15 closes the valve casing 1. It will be seen from Fig. 2 that the tube 10 is open at the bottom.

Figure 3:
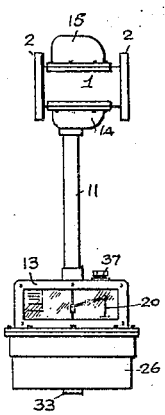
Fig. 3 is a front elevation of a single regulator valve.

The flanges 2, as shown in Fig. 1, are connected to flanged pipes 16 and 17, the former being connected to the top of the storage tank, and the latter leading to a recovery system (not shown). The casing 13 affords a compartment for the adjustable weights 18 stored on a support 19. When these are placed directly on the disk 7 they add to the pressure required beneath the disk to raise it. When they are placed on the suspension support 20 they subtract or reduce the amount of pressure necessary beneath the disk 7 to move it. This reducing system comprises a lever 21 fulcrumed at 22 and having a forked end 23 connected by side links 24 to a head 25 secured on the threaded lower end of the stem 8 by means of adjustable nuts placed above and below the head. The casing 13 rests on a lower cylindrical casing 26, and it may have a glass front as shown in Fig. 3, if desired. This casing 26 has an inner wall 27 which leaves an annular groove between it and the outer wall into which the flange 28 depends to form a seal with the oil that is placed inside of the casing 26.

An oil drain plug 29, as shown in Fig. 1, and an oil filling fitting 30 is attached to the side of the casing 26. These communicate with the oil seal chamber into which the flange 28 dips. The drain plug 31 closes an opening leading to the inside of the wall 27. It serves to drain any condensation that may accumulate beneath the diaphragm 7. To facilitate the accumulation of the condensation at this point the floor 32 of the casing 26 slopes from the center downward. A pressure control opening 33 is formed in this bottom for direct connection to the roof 34 of a tank, as shown in Fig. 1, or it may serve as an atmospheric opening closed by a screen for a vacuum control and alternatively for a control pipe 35 when the casing 26 is to serve as a pressure regulator, as shown in Fig. 4.

The casing 13 is provided with an opening 36 which, when a single control device is used, may be closed by a plug 37; but when a pair of separate regulators are used, as shown in Fig. 4, the opening 36 of the pressure regulating casing is provided with a screened air inlet 38, and for the vacuum controlled casing 13 a pipe 39 is connected to such opening. The pipe 39 is joined to pipe 35 and both are connected to a small size control pipe 40 which leads to the top of one or more tanks, as desired.

A large size vapor pipe 41 leads from the top of one or more tanks to a T 42 placed between a pair of casings 1, as shown in Fig. 4. In this relation the duplicately formed casings 1 are attached to the T 42 in transposed relation. A vapor delivery pipe 43 leads to a recovery system. It is attached to the left hand casing 1. To the right hand casing 1 an inlet pipe 44 is attached. This pipe serves to admit a non-inflammable gas at the top of the tank whenever a vacuum is being formed. A mercury filling elbow 45 is placed in the outside tube 11 and a condensation plug 36′ is placed in the same tube near its upper end. A condensation drain 46 is also attached to the control pipe 35, as shown in Fig. 4.

The operation of my control device is very simple. When connected as shown in Fig. 4, a vacuum causes the diaphragm 7 in the right hand control to be raised, which in turn raises the valves 4 and 5 and admits gas through pipe 44 to the top of the tank. The presence of this negative pressure is communicated through pipe 35 to the pressure control at the left hand side of Fig. 4 which serves to hold the disk 7 in its lowest position, thus keeping its attached valves 4 and 5 closed so that there is no escape of the admitted gas into the recovery line 43.

In the case of a pressure being formed in the storage tank this is transmitted through the control pipe 40 to the pipe 39 which keeps the vacuum disk 7 and its attached valves "closed" so that no gas can enter the system through pipe 44, but the pressure passing through pipe 35 and admitted beneath the pressure disk 7 serves to raise the same and its attached valves and permit the accumulated vapor to pass from pipe 41 out through the recovery pipe 43.

As the stem 8 does not have a frictional bearing in the pipe 12 and the tube 10 attached to this stem, it will be seen that the moving system is subjected to a minimum frictional resistance which insures a sensitiveness of operation that has been hitherto unattained. In fact, fluctuations of positive or negative pressures ranging from five-hundredths to four-tenths of an ounce are automatically taken care of, thus making a super-sensitive control possible which will operate at any desired pressure and vacuum from two pounds pressure down to two inches of vacuum.

The operation is simply the lifting of the dead weight of the aluminum operating disk 7, operating stem 8, and the aluminum balanced poppet valves 4 and 5. Each one of the aluminum operating disks may have a lifting area of two hundred square inches. Each ounce added or taken from the weight of operating disk 7 changes the operating pressure one-two hundredths of an ounce. My regulators do not require any limits between which they will operate, but will operate at the exact pressure desired.

Briefly stated, the control unit shown in Fig. 4 simply consists of two of the controls, shown in Fig. 1, placed side by side and mounted on a suitable channel iron base 47. The system is equipped with a pressure gauge 48 in pipe 44 and a vacuum gauge 49 in pipe 43. A manometer 50 for reading pressure or vacuum in the storage tank is attached to pipe 40.

The mercury seal or standard regulator is good for sixteen inches vacuum and eight pounds pressure, and the oil seal for the disk 7 is sufficient for pressures up to one and a half ounces. For higher pressures up to twenty-four ounces a mercury seal can be used for the disk 7.

What I claim is:

1. In super-sensitive controls, a pair of poppet type balanced valves, a pair of operating disks, a pair of connecting stems between the disks and valves, each valve stem and disk constituting a separate control mechanism, separate supporting and enclosing means for each mechanism, an interconnecting pipe system between said pair of valves, and an interconnecting positive and negative pressure system differentially connected for operating the disks in reverse directions simultaneously.

2. In super-sensitive controls, an upper casing, a pair of balanced valves in the casing, a separate and lower casing remote from the valve casing, a tube attached to both casings, a light weight flanged float in the lower casing, a rod passing through the tube connecting the valves to the float, a mercury seal in the tube for the rod, a liquid seal for the float, means for subjecting the float on its upper face to a negative pressure, and means adapted to subject the float on its under side to a positive pressure.

3. In super-sensitive controls, an upper casing, a balanced valve in the casing, a separate and lower casing remote from the valve casing, a supporting tube attached to both casings, a light weight flanged float in the lower casing, a rod passing through the tube connecting the valve to the float, a second tube open at the bottom secured to the rod, a universal joint between the rod and the balanced valve, a mercury seal within the supporting tube for the rod, a liquid seal for the float, and means for subjecting the float on its opposite faces to differentiating positive or negative pressures.

4. In super-sensitive controls, an upper casing, a pair of balanced valves in the casing, a separate and lower casing remote from the valve casing, a tube attached to both casings, a light weight flanged float in the lower casing, a rod passing through the tube connecting the valves to the float, a mercury seal in the tube for the rod, a liquid seal for the float, and means for subjecting the float on its opposite faces to differentiating positive or negative pressures.

In testimony whereof I affix my signature.

STEPHEN H. BROOKS.